United States Patent [19]

Giordano et al.

[11] 4,415,914
[45] Nov. 15, 1983

[54] GRAY SCALE ELECTROSTATIC RECORDING SYSTEM AND A STYLUS DRIVER THEREFOR

[75] Inventors: Francis P. Giordano, Scarsdale; Robert J. Henshaw, New City, both of N.Y.

[73] Assignee: International Business Machines Corporation, Armonk, N.Y.

[21] Appl. No.: 278,965

[22] Filed: Jun. 30, 1981

[51] Int. Cl.³ .................... G01D 15/06; H04N 1/22
[52] U.S. Cl. ............................... 346/154; 358/298
[58] Field of Search ...................... 346/154, 153.1; 101/DIG. 13; 358/298–300

[56] References Cited

U.S. PATENT DOCUMENTS 3,569,983  3/1971  Marshall ........................ 346/154
3,631,509  12/1971  Marshall ........................ 346/154

*Primary Examiner*—Thomas H. Tarcza
*Attorney, Agent, or Firm*—Roy R. Schlemmer

[57] ABSTRACT

An electrostatic gray scale printing system is disclosed having particular utility for producing gray scale images from signals received from a suitable data source such as a computer, telecommunications line, data storage device or the like. A unique, high voltage, pulse generating circuit is provided for producing gray scale voltage pulses between 300 and 600 volts to the individual styli making up said printing device. The circuit utilizes a conventional, low voltage, power supply and a low voltage gray scale intensity signal input to produce the required high voltage printing pulses. The circuit, per se, consists of a high voltage transistor having a relatively large inductance connected in its emitter-collector circuit path. Current flows in the transistor in response to an input voltage applied to the base of the transistor. The collector current is proportional to the value of the input signal divided by the emitter resistor. When the transistor is cut off the inductive tank circuit, including said inductor, produces a high voltage output pulse proportional to the original signal placed on the transistor base. The width of said output pulse is related to the value of the resistor in the inductive tank circuit which also controls the damping of the output pulse.

12 Claims, 3 Drawing Figures

PRINTER BLOCK DIAGRAM

GRAY SCALE ELECTROSTATIC RECORDING SYSTEM AND A STYLUS DRIVER THEREFOR

FIELD OF THE INVENTION

The present invention is of particular utility in the field of electrostatic gray scale recording. More particularly, it relates to a unique circuit for producing gray scale electrostatic recording pulses for use in combination with such electrostatic recording systems.

BACKGROUND OF THE INVENTION

Electrostatic recording involves placing a substantial charge on very small discrete areas of a dielectric recording medium. Conventionally, the dielectric medium comprises, for example, a recording paper passed between a plurality of small, closely spaced styli and a backup plate or platen. Thereafter, a developer or toner is applied to the recording medium to render the charged areas visible. Subsequently, the recording medium with the toner applied is passed by a fixing station, usually a thermal element, which melts or otherwise causes the toner to be permanently fixed to the recording medium or paper.

To achieve gray scale recording it is necessary to place controlled charges on the dielectric material by the use of charging pulses of varying intensity. Then, depending upon the amount of charge on the paper the variable amount of toner will be deposited achieving a range of grayness between white and black. The number of levels of gray scale varies in different systems. The use of 16 gray scale levels is relatively well known.

In order to obtain resultant recordings having good quality, voltage ranges of the applied pulses between 300 and 600 volts are necessary to produce the requisite charge on the dielectric medium.

The development of modern electronic computers and their attendent ability to handle very large volumes of data in extremely short periods of time places heavy demands on output or printing apparatus. Thus, in order to operate a printer at a high data rate, it is necessary to produce the required high voltage charging pulses with short durations in order to produce a single gray scale picture element (pel) on the recording medium.

In order to accomplish such high printing speeds in an electrostatic gray scale recording system, extreme demands are placed on the pulse generating circuitry since the pulse producing process requires not only the fast switching, i.e., turn-on and turn-off of high-voltage levels, but also requires the generation of many different voltage levels within the writing range.

DESCRIPTION OF THE PRIOR ART

Due to the previously enumerated problems the use of gray scale electrostatic recording has been limited in the past. In order to minimize the demands on the pulse switching circuitry, various means have been devised for placing biases, for example, on the backup platen, so that these biases, both DC and pulsed, when combined with a printing pulse, provide a sufficient potential to effect the desired charging of the dielectric recording medium. Marshall U.S. Pat. No. 3,631,509 discloses such a combined pulse generating system wherein two pulses are generated and combined to form the necessary charging potential between the writing styli and backup electrode. The Marshall system requires not one but two pulse forming networks and it will also be noted that high voltage power supplies are required for the pulse generating networks.

Marshall U.S. Pat. No. 3,569,983 discloses an electrostatic recording system similar to that of patent 3,631,509 in that it also discloses a system for combining voltage pulses on both styli and backup platen to cumulatively provide the required stylus voltage or stimuli necessary to achieve charging of the dielectric recording medium. This patent similarly, requires the use of high voltage power supplies and high voltage components throughout.

Jones Pat. No. 3,855,538 discloses the combination of a digital-to-analog converter connected to pulse shaping circuits. Further, the pulses produced increase in amplitude as a counter connected to the input of the digital-to-analog converter (DAC) changes in value. Thus, an analog pulse is produced proportional to the value of the digital signal. The Jones pulse producing circuit is utilized for well-logging apparatus rather than for electrostatic recording systems, however, it serves to illustrate an analog circuit capable of producing an analog output pulse proportional in amplitude to the magnitude of a digital input signal.

All of the known prior art in the electrostatic printing field utilizes expensive and complicated high voltage power supplies in combination with appropriate switching circuitry to provide the requisite high voltage pulses required for electrostatic recording. However, due to the complexity and expense of both the power supplies and the switching circuitry, the use of such recording systems has been limited.

SUMMARY OF THE INVENTION

It is a primary object of the present invention to provide an improved electrostatic gray scale printer.

It is another object of the invention to provide such a gray scale printer of considerably reduced complexity and lower cost than those currently available in the art.

It is a further object of the invention to provide a stylus driver for such a printer utilizing a conventional, low voltage power supply and readily available high voltage transistor.

It is a still further object of the invention to provide such a stylus driver circuit which utilizes an inductive switching circuit in the emitter-collector circuit of the transistor which produces the high voltage print pulse of required polarity when the transistor is cut off.

The objects, features and advantages of the present invention are accomplished, in general, by an electrostatic gray scale printing system, including means for receiving and processing suitable digital gray scale signals. The printing station comprises a plurality of individual printing styli each selectively connectable to an appropriate stylus driver and, a backing platen for providing a circuit path for charging an electrostatic recording means disposed between the printing styli and said platen. The stylus driver comprises means for receiving the gray scale print signals and for converting same to high voltage print pulses having a range of from approximately 300 to 600 volts and capable of placing an electrostatic charge on the surface of said recording medium proportional to the voltage of the signal applied to an associated stylus.

More particularly, said stylus driver comprises input circuit means for placing a control signal upon the base of a high voltage transistor to maintain a current flowing in the emitter-collector circuit of said transistor which current is substantially proportional to the magnitude of the signal placed on the base thereof. An inductive tank circuit is located in the emitter-collector circuit of said transistor and signal output means are connected across said tank circuit whereby a high voltage pulse is produced when said transistor is rendered substantially non-conductive.

According to the preferred embodiment of the invention the inductive tank circuit consists of a relatively large inductor and a resistor connected in parallel in the collector circuit of the transistor and the input circuitry for said transistor comprises an operational amplifier hooked up as a sample/hold which provides a high impedance input and a constant current source for driving said transistor.

DESCRIPTION OF THE PREFERRED EMBODIMENT

Figure 1:
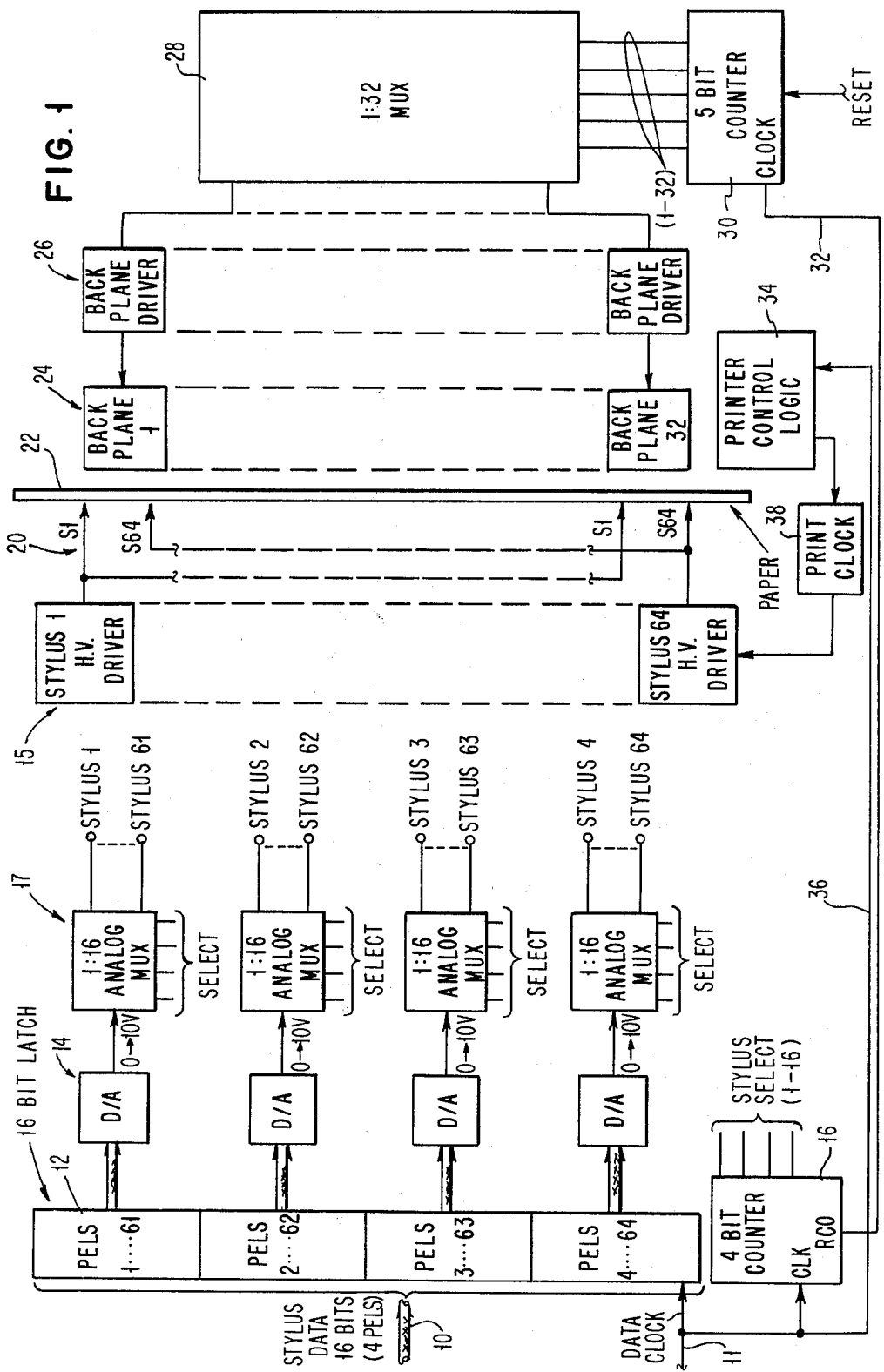
FIG. 1 comprises a combination functional block and logical schematic diagram of a high speed digitally controlled gray scale recording system constructed in accordance with the teachings of the present invention.

Referring to FIG. 1, an overall electrostatic gray scale printing system constructed in accordance with the present invention is disclosed. For the purposes of the present description it is assumed that a 16 level gray scale recording system is utilized. As will be apparent to those skilled in the art, 4 bits are required to designate a particular gray scale value, i.e., 0-15. Thus, for each pel to be printed on the recording paper, the 4 bit signal is utilized to designate the particular gray scale value for a particular pel. It is further assumed that there are 2,048 total pels and thus, 2,048 individual styli in the print head. As will be apparent from the subsequent description, these are broken down into 32 groups each containing 64 styli. It will be readily apparent to those skilled in the art that all of the above described values are readily representable in binary code. It will also be apparent that other values could readily be used. For example, a greater or lesser total number of pels on a line could be employed.

Referring again to FIG. 1 image data enters the system via the input bus 10 in groups of 16 bits. These 16 bits represent the gray scale value for 4 consecutive individual pels. It should be noted at this time that if each 16 bit group of bits is considered an input data word then there would be 512 such words of image data required to represent a single print line. This is so because there are 4 pels represented by each data word and 2,048 pels make up a single print line. Referring still to FIG. 1, it will be noted that each word of data entering via the input bus 10 enters the 16 bit latch 12. This latch is broken into 4 individual 4 bit storage positions. The upper set of 4 latches stores the bits for one pel therein. The data clock pulse entering on line 11 causes the latches to gate a new group of 16 bits into same. Individual 4 bit digital-to-analog converters 14 are connected to each of the 4 sets of latches comprising the input data latch 12. As will be understood, they convert the 4 bit binary gray scale input signal to an analog representation of the particular gray scale value. In the present embodiment a range from 0 to 10 volts is utilized for representing the 16 gray scale values. Thus, at any one time, up to four different analog values may appear on the outputs of the 4 digital-to-analog converters 14, which will become the inputs to the four 1 out of 16 analog multiplexers 17.

Each of these multiplexers is essentially a switch which connects the inputs to one of sixteen outputs. The selection is accomplished by means of the 4 binary input lines indicated "select" at the bottom of each multiplexer switch 17. These are driven by the 4 bit counter 16 which counts repetitively from 1 to 16 and is automatically reset to 1. Thus, in operation, the 4 bit counter 16 causes the four individual multiplexers 17 to selectively step through all 16 outputs in parallel. When the 4 bit counter 16 is set to a binary 1, the first output line from each of the 4 multiplexers 17 would be energized, thus energizing the upper outputs from each multiplexer which are labeled styli 1, 2, 3 and 4. Similarly, if the 4 bit counter 16 were set to a binary 5 it would mean that the 5th from the top output line from each of the multiplexers would be energized and would energize output lines denoted as styli 17, 18, 19, and 20. Finally, when the 4 bit counter reaches a count of 16, the last output line from each of the multiplexers would be energized which would correspond to styli lines 61, 62, 63 and 64.

Each of the stylus output lines from the multiplexers is connected to an individual high voltage stylus driver 15. As will be noted in the figure, there are 64 such high voltage stylus driver circuits.

It will be understood that when the stylus drivers 15 receive an appropriate print clock, they will produce a high voltage output pulse on their output line proportional to the analog gray scale value received at their signal input as will be described in greater detail subsequently. There are 32 groups of styli, each numbered S1 through S64. Each of these 32 groups of 64 styli is located opposite 1 of the 32 segments of the back plane 24. It will further be noted that 1 stylus in each of the 32 groups is connected to the same high voltage stylus driver. While only the top and bottom driver are shown in the figure, there are 62 intermediate drivers connected to the styli S2 through S63. Further, each driver is connected to 32 individual styli, 1 in each of said 32 groups.

Due to the nature of the signal input circuit of the present driver circuit, it is possible to hold this input signal for an extended period of time whereby it is possible to process 64 consecutive input pels (sixteen 4 pel words) to load all 64 drivers. In this way, all 64 styli making up each of the 32 segments may be printed at one print clock time.

It will, of course, be understood that when a pulse appears at the output of the 64 selected drivers, an appropriate charge signal will be placed on the dielectric recording paper 22 in accordance with the particular back plane which is energized at that time.

There are 32 individual styli numbered S1, S2, S3, etc., through S64 (or a total of 2,048). Each of these numbered styli is directly connected to the output of its similarly numbered high voltage driver. Thus, all 32 styli indicated as S1 are connected to the high voltage stylus driver #1, etc.

As stated previously, only one stylus in each group of 32 may be selected for print mode at any one time. The particular stylus selected is determined by which of the 32 back planes is currently energized. For the first 16 input data words which carry the image gray scale information for the first 64 pels, back plane 1 would be energized. For the next 16 input data words, back plane #2 would be energized, etc. Thus, it may be seen that a given scan line is developed across the recording paper, 64 pels at a time until the entire 2,048 pels constituting the scan line have been suitably recorded on the paper.

Back planes 1 through 32 are selectively energized by their own individual back plane driver circuits. These back plane drivers could either be suitable grounding circuits or, alternatively, could place a bias on the back plane which acts in concert with the charge on the individual styli to aid in the deposition of the electrostatic charge. It is possible to use a lower voltage transistor in the stylus driver circuit if a bias is placed on the back plane. However, it has been found that with the present invention a sufficient pulse may be obtained from the herein disclosed novel high voltage stylus driver circuit to produce satisfactory gray scale charges on the paper without additional high voltages applied to the back planes.

The particular back plane is selected by the 1 out of 32 multiplexer 28. This multiplexer produces an energizing signal for a particular back plane driver selected via the input from the 5 bit counter 30. As will be appreciated, the 5 bit counter 30, as well as the 4 bit counter 16, is reset to a 1 at the beginning of each scan line.

As described previously, 4 bit counter 16 initially causes the 5 bit counter to be set to a 1 causing back plane 1 to be energized. This allows the first 16 input data words to develop the first 64 pels across the scan line at which point the 4 bit counter will reach a count of 16 which will cause the 5 bit counter to be incremented appropriately and back plane 2 will be energized while the next 16 input data words are received to produce the next 64 pels across the scan line. This process continues, as will be understood, until all 32 back planes have been consecutively energized and thus, all 2,048 pels have been generated.

The printer control logic 34 receives a pulse from the data clock over line 36 as each input data word is received via the input bus 10. The output of the printer control logic 34 controls the operation of the actual print clock 38.

The print clock performs two functions in parallel by energizing switches SW2 and SW3. It removes the input signal $V_{in}$ from A1 causing the output of A1 to switch to ground rapidly turning off Q1, at the same time SW3 aids in the rapid turn off of Q1 by discharging the base emitter capacitance through the low impedance of the switch. This rapid turn-off produces the high voltage pulse $V_{out}$ since the current in the inductor cannot change instantaneously.

It will be noted that the switch SW2 is necessary to remove the input voltage signal $V_{in}$ from an input to the high voltage pulse generator so that a new gray level may be applied to the stylus next print cycle. Since all #1 styli are in parallel in the 32 groups of styli, as are other similarly numbered styli, removal of $V_{in}$ from $C_{in}$ must be done to prevent cummulative gray levels from storing on $C_{in}$. It is apparent that other, more complex selection circuits could be utilized to assure that only the desired four high voltage pulse generators are selected at any given period of time.

The printer control logic 34, operating together with the print clock 38, is essentially a time delay circuit which must provide sufficient time for the output of the digital-to-analog converters 14 to be stabilized before energizing the 1:16 analog multiplexor (mux). Sufficient time must be allowed for the high voltage pulse generator currents to stabilize in accordance with the input signal received before switches SW2 and SW3 are energized to produce the print voltage $V_{out}$. As stated previously, the overall system architecture for such a gray scale printer could take on many forms. At one extreme, a single pel could be processed at a time which would eliminate nearly all of the selection circuitry including the multiplexers, etc., and would only require a single stylus driver selectively connectable to all of the 2,048 styli. However, while this would be most economical, both in terms of hardware and channel bandwidth costs, it would be prohibitively expensive in terms of transmission and recovery time for a fully facsimile image. At the other extreme, separate circuitry, could be provided for generating all 2,048 pels simultaneously and although the multiplexers 17 and 28, as well as their control counters, would be eliminated, the number of input storage latches 12, digital-to-analog converters 14 and high voltage stylus drivers 15 required would be prohibitive.

Other intermediate designs would also be possible. The most obvious and practical extension would be to generate groups of pels 64 at a time. This would obviously require 64 four bit input data latches 12 and 64 digital-to-analog converters 14. However, no selection multiplexers 17 would be needed. With such a design, since all 64 high voltage stylus drivers would be simultaneously actuated, it would only require 32 print cycles to print a complete scan line instead of the 512 print cycles required with the preferred embodiment disclosed. As will be apparent, many other design modifications could be made in the system without departing from the essential spirit and scope thereof, as defined in the following claims. An alternative structure which may be used in place of the segmented backing platen is a segmented conductive bar or platen on the same side of the paper as the styli placed on one or both sides of the styli and preferably integral with the styli structure. As with the backing platen, it provides a charging path for the high voltage print pulses whereby a charge may be placed on the paper. In this case a simple backing roller would be used on the opposite side of the paper to maintain paper to styli distance and the conductive platen would be segmented and selectively energized in the same way as the backing platen described previously.

Figure 2:
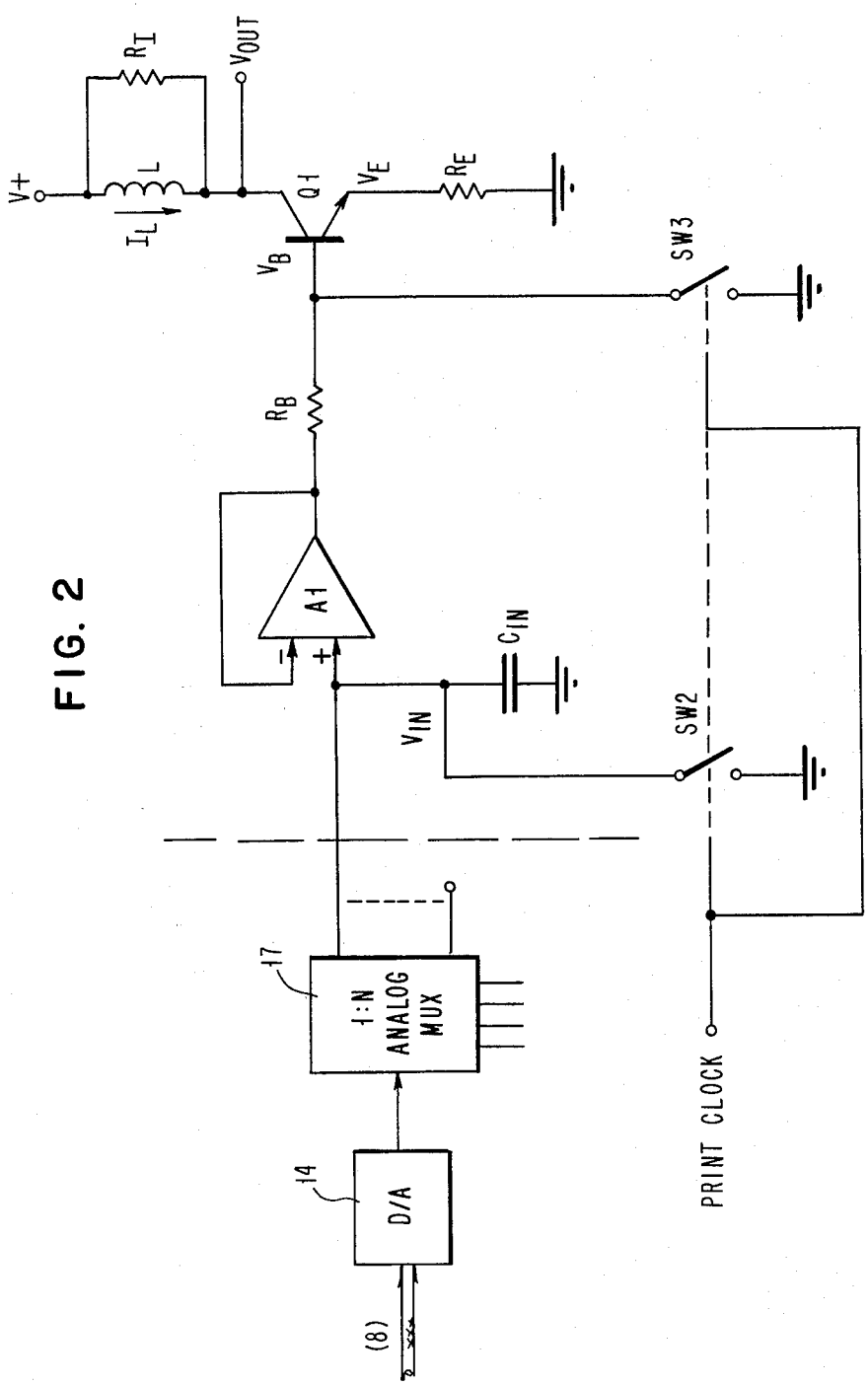
FIG. 2 comprises a logical schematic diagram of the herein disclosed high voltage stylus driver circuit shown in FIG. 1.

Having described the overall operation of a typical digitally controlled electrostatic gray scale printer constructed in accordance with the teachings of the present invention, there will now follow a detailed description of the specific high voltage pulse generating circuits 15 one of which is shown in detail in FIG. 2.

As stated previously, electrostatic black-white printing involves the charging of a dielectric type paper to an appropriate level in those areas where it is desired that a mark be made and then passing the paper through a toner station to develop the charged areas. The voltage levels necessary for the charging process are normally between 300 volts and 600 volts. Gray scale printing involves the generation of a charge voltage proportional to the intensity level desired. This process involves not only the fast switching of high voltage levels, but also the generation of many different voltage levels within the writing range. The herein disclosed method of driving the stylus involves the generation of a short (i.e., 0.5 usec–1.0 usec) high voltage pulse whose height or peak-amplitude is proportional to the desired gray scale level. This circuit also has a fast recovery time to enable fast writing and re-initialization of gray scale level.

A high voltage stylus driver circuit embodying the above concepts is shown in FIG. 2. The circuit is supplied with a voltage $V_{in}$ proportional to the 4 bit gray scale value. This voltage would be supplied by the digital-to-analog converter 14 followed by the analog multiplexer 17 as shown, thus allowing many driver circuits to be supplied by a single digital-to-analog converter and analog MUX. Other and different input circuit configurations are also possible as described previously.

The input circuit is formed by the voltage holding capacitor $C_{in}$ and an operational amplifier (op-amp) voltage follower circuit A1. At an appropriate time before printing, $V_{in}$ is applied to $C_{in}$. This voltage appears on the output of the op-amp A1 and is held constant for a relatively long period because of the high input impedance of the op-amp. At this time, both SW2 and SW3, are open and do not affect the operation of the voltage follower.

The actual high voltage pulse driver circuit consists of a high voltage transistor Q1 with an inductor L and resistor $R_I$ in its collector circuit, and a low value ($\sim 100$ ohms) emitter resistor $R_E$. The op-amp output voltage feeds the base of Q1 through $R_B$ and causes a constant current to flow through the inductor approximately equal to $V_{in}$ divided by $R_E$. The values of $R_E$, L, $R_I$, and turn-off time of Q1 are chosen to give the proper voltage range desired for given values of $V_{in}$ and then the output pulse height is proportional to $V_{in}$ alone. Suitable values are shown in TABLE I below.

TABLE I

For $V_{out}$ (peak) of 300V → 600V with a $V_{in}$ of OV-10V the following component values work:

| | | | |
|---|---|---|---|
| L | = 2.5 millihenrys | $R_B$ | = 500 ohms |
| $R_I$ | = 20K ohms | A1 | = LM310 |
| $R_E$ | = 100 ohms | $C_{in}$ | = .001 microfarads |
| Q1 | = 2N5012 | V+ | = 24 Volts |

Returning to the operation of the circuit, next the print clock causes SW2 and SW3 to close. The closing of SW2 bleeds the charge off $C_{in}$ to prepare for the next print cycle. Closing SW3 rapidly turns off Q1. Since the inductor current I cannot change instantaneously due to collapsing magnetic flux around L, it flows through $R_I$ generating a high voltage pulse. Since $I_L$ is determined by $V_{in}/RE$, the output pulse is proportional to $V_{in}$ within the range chosen by components L, $R_I$, $R_E$ and Q1.

$$VO = L(dI/dt)$$

This circuit, because of the generation of constant current $I_L$ in the inductor, is relatively free of dependence on the delay time from application of $V_{in}$ to the actual print clock. This is an important factor in systems where the time from pel position to pel position is variable. The components listed in TABLE I have allowed the generation of 300 V to 600 V pulses with a pulse width of $\approx 1$ usec for input voltages $V_{in}$ of 0 V to 10 V.

While the switches SW2 and SW3 are implied mechanical switches in the figure, it is to be understood that these would obviously electronic or solid state devices which would be rendered conductive by the application of an appropriate control pulse thereto.

Similarly, it will be apparent that a number of obvious changes could be made to the basic pulse driver circuit, the use of an LR circuit connected in parallel in the emitter-collector path of the primary pulse forming transistor Q1.

Also, the operational amplifier A1, while representing the best mode contemplated, could be replaced by other circuits capable of suitably placing the proper conductive signal on the base of the transistor Q1, which will cause current to flow in the emitter-collector path substantially proportional to the input signal. These might include the input capacitor $C_{in}$ feeding the gate of an FET to form a sample/hold circuit.

Figure 3:
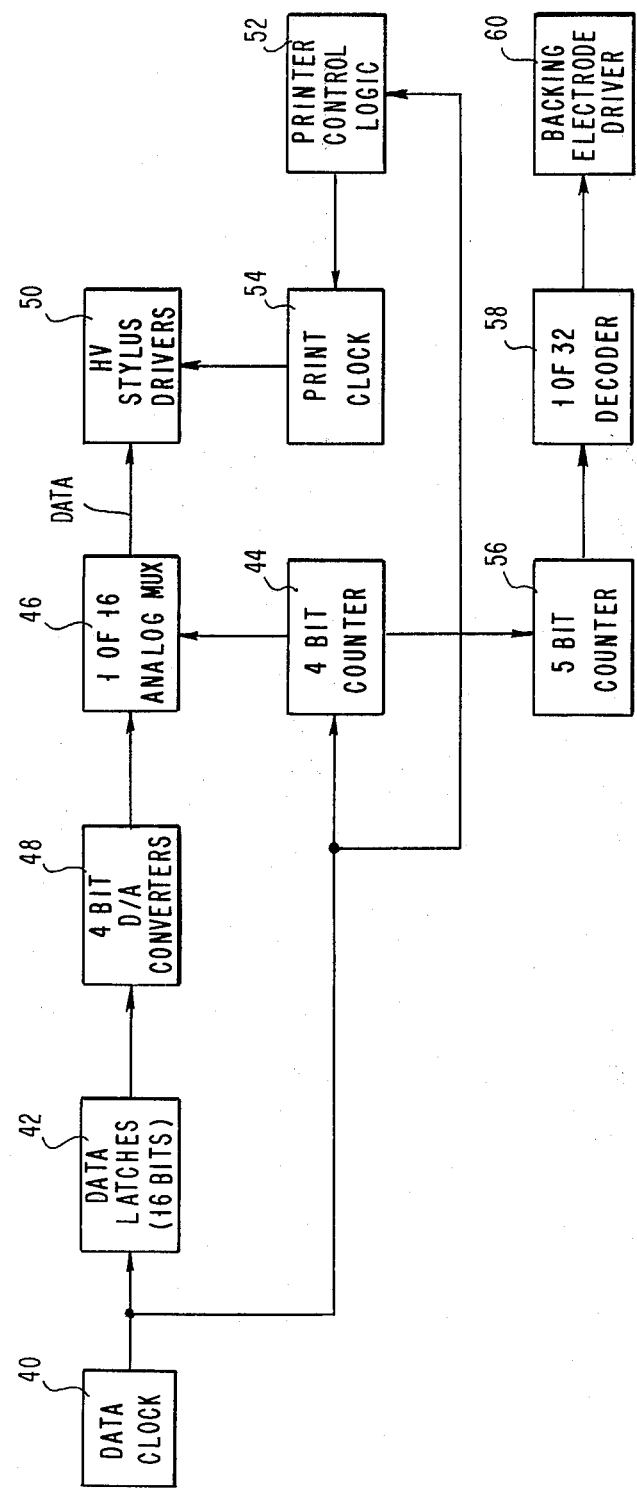
FIG. 3 comprises a functional block diagram of the printer of FIG. 1 specifically illustrating the data flow and control sequences.

Referring now to FIG. 3 there is shown essentially a functional block diagram of the overall system of FIG. 1 organized to show data flow within the printer. Data clock 40 and the data latches 42, as in FIG. 1, essentially comprise the digital gray scale input. If the data is considered to be coming directly from a channel, the data clock pulses would essentially be interspersed with the 16 bit image data words. On the other hand, if the system were considered to be driven from a memory or any other storage device, the data clock 40 would control the accessing of the memory to produce consecutive input data words. In any event, the data clock pulses are fed directly to the 4 bit counter 44 to control the 1 of 16 multiplexers 46. As will be remembered from the description of FIG. 1, each of the multiplexers receives a single analog gray scale input from the 4 bit D/A counters 48 and selectively connects same to 1 of its 16 output lines.

The output of the MUX 46 is selectively connected to the various high voltage stylus drivers 50. Printer control logic 52 and the actual print clock 54 are driven by the basic data clock as was described previously and the output of the print clock controls the switches SW2 and SW3 in the individual high voltage stylus drivers 50. Also, as in FIG. 1, the 5 bit counter 56, the 1 of 32 decoder 58, and the backing electrode driver 60 are all driven serially by the output of the 4 bit counter each time it reaches a count of 16 and resets to one. Each time the 5 bit counter 56 is incremented, the 1 of 32 decoder 58 causes a different one of its output lines to be energized to, in effect, energize a different section of the 32 section backing electrode (or back plane) via the backing electrode driver 16. As will be remembered from the previous discussion of FIG. 1, the backing electrode driver in the preferred embodiment is merely a switching circuit to selectively ground consecutive segments of the backing electrode to enable the print voltage pulses to establish a sufficient electric field to impose an electrostatic charge on the dielectric paper 22. Electrostatic gray scale printers constructed in accordance with the teachings of the present invention and specifically utilizing the herein disclosed high voltage stylus driver circuits produce excellent quality gray scale recordings. By using the present circuit design, high voltage power supplies with their attendant costs are eliminated. The particular pulse forming transistor Q1 disclosed herein is typical of transistors currently available today. The present design greatly reduces the cost of such printers without in any way sacrificing the quality of the resultant records produced.

INDUSTRIAL APPLICABILITY

The herein disclosed electrostatic gray scale printer has application in any area of industry where it is desired to produce gray scale facsimile images. While it would have applicability to and could be used as a line printer for merely printing text output from a computer or the like, its greater field of applicability would be in the general facsimile area where the 16 gray scale levels available make the printer capable of producing excellent quality facsimile images. Accordingly, the printer would have primary utility where it is desired to provide good to excellent quality facsimile images of pictorial data, shaded mechanical drawings, complex graphs and the like and any other application where the gray scale capability produces a far superior image to simple black-white printing.

Because of the lower cost of the disclosed high voltage pulse forming circuit which is the basis of the high voltage stylus drivers, it is possible to substantially reduce the cost of the resultant printing system on a one-to-one basis. Alternatively, it is possible to utilize many more such stylus drivers in a given system, and thus be able to print at much higher speeds for the same overall cost.

Having thus described our invention, what we claim as new, and desire to secure by Letters Patent is:

1. An electrostatic gray scale printing system comprising means for moving a dielectric recording medium past a recording station,
    said recording station including a plurality of conductive printing styli disposed to establish a scan line transverse to the direction of motion of said recording medium,
    a conductive platen located adjacent to said styli,
    said conductive platen and said styli being effective when suitably actuated to establish a charging path for placing an electrostatic charge on discrete areas of said recording medium immediately adjacent to selected styli,
    inductive pulse forming means selectively connectable to said styli for producing variable high voltage gray scale pulses for forming electrostatic images of a variable magnitude on said recording medium from a low voltage power supply,
    said pulse forming means further including transistor means operable with said low voltage power supply to establish a current through an inductor included in said inductive pulse forming means proportional to variable input signals supplied thereto and means for interrupting the current flow through said transitor to produce an inductively generated output pulse across said inductor proportional to the current flowing therethrough.

2. An electrostatic recording system as set forth in claim 1 including input circuit means for said transistor for establishing a control signal on the base thereof which remains substantially constant for a period of time substantially longer than the longest time period between print pulses.

3. An electrostatic gray scale printing system as set forth in claim 2 wherein said input circuit means comprises an operational amplifier characterized by having a constant output signal and a very high input impedance.

4. An electrostatic gray scale printing system as set forth in claim 3 wherein said conductive platen is located on the opposite side of said recording medium from said styli and wherein said platen is composed of a plurality of separately actuable segments and,
    means for selecting and actuating a particular segment of said platen whereby only the styli located opposite from said platen are capable of causing a charge to be placed on said recording medium.

5. An inductive high voltage stylus driver circuit for producing variable gray scale voltage pulses for use with an electrostatic printing system comprising transistor means including base, emitter and collector regions,
    a low voltage power supply for establishing an operational current through the transistor,
    means for periodically supplying said circuit with control signals for producing print pulses at precise predetermined times,
    inductor circuit means in the emitter-collector circuit of said transistor for producing a high voltage inductive pulse proportional to the current flowing through same when said current is suddenly interrupted,
    input circuit means for said transistor for applying a variable input signal to said transistor base to render same conductive, current flowing through said transistor being proportional to the magnitude of said input signal,
    said input circuit means including a capacitor for storing said input signal for an extended period of time substantially greater than the normal period between said print pulses and representing a very high impedance to signal bleed-off from said capacitor.

6. An inductive pulse forming circuit as set forth in claim 5 wherein the signal input circuit includes means for maintaining a substantially constant input gray scale signal on the base of the transistor whereby said signal is substantially unaffected by differences in the period of said print clock.

7. An inductive pulse forming circuit means as set forth in claim 6 wherein the input circuit means comprises an operational amplifier characterized by having a constant output signal in response to a signal supplied to its input and for presenting a very high input impedance.

8. An electrostatic gray scale printing system comprising data input means for receiving gray scale image data,
    means for deriving an analog gray scale signal for each pel to be printed,
    a printing station comprising a plurality of printing styli arranged to produce a scan line across a dielectric recording medium in close proximity to said recording medium, a conductive platen adjacent to said recording medium and said styli, selectively actuable to establish an electric field of between 300 and 600 volts between said styli and said platen and passing through said recording medium whereby an electric charge may be placed on said recording medium proportional to a high voltage pulse on said styli,
    at least one high voltage stylus driver selectively connectable to each of said styli and adapted to receive said analog gray scale signals at its input and supply high voltage printing pulses to said connected stylus,
    said high voltage stylus driver comprising a transistor having a low voltage biasing means connected thereto and an inductor circuit in its emitter-collector circuit which produces a high voltage pulse when current flowing through said inductor is suddenly interrupted and print means connected in the base circuit of said transistor for selectively rendering said transistor nonconductive.

9. An electrostatic gray scale printing system as set forth in claim 8 wherein said inductive pulse forming circuit is located in the collector circuit of said transistor.

10. An electrostatic gray scale printing system as set forth in claim 9 wherein said inductive pulse forming circuit comprises an inductor and a resistor connected in parallel and wherein, when current through said inductor is interrupted a high voltage pulse is produced across said resistor and transmitted to a selected stylus.

11. An electrostatic gray scale printing system as set forth in claim 10 wherein said conductive platen is located on the opposite side of said recording medium from said styli, said platen being composed of a plurality of separately actuable segments and, means for selecting and actuating a particular segment of said platen whereby only those styli located opposite from said platen are capable of causing a charge to be placed on said recording medium.

12. An electrostatic gray scale printing system comprising data input means for receiving gray scale image data, means for deriving an analog gray scale signal for each pel to be printed, a printing station comprising a plurality of printing styli arranged to produce a scan line across a dielectric recording medium in close proximity to said recording medium, a conductive platen located on the opposite side of said recording medium from said styli, wherever said platen is composed of a plurality of separately actuable segments effective to establish an electric field of between 300 and 600 volts between said styli and said platen and passing through said recording medium whereby an electric charge may be placed on said recording medium proportional to a high voltage pulse on said styli, means for selecting and actuating a particular segment of said platen whereby only those styli located opposite from said platen are capable of causing a charge to be placed on said recording medium, at least one high voltage stylus driver selectively connectable to each of said styli and adapted to receive said analog gray scale signals at its input and supply high voltage printing pulses to said connected stylus, said high voltage stylus driver comprising a transistor having a low voltage biasing means connected thereto and a pulse forming circuit comprising an inductor and resistor connected in parallel in its collector circuit which produces a high voltage pulse when current flowing through said inductor is suddenly interrupted and print means connected in the base circuit of said transistor for selectively rendering said transistor nonconductive.

* * * * *